(12) United States Patent
Gao et al.

(10) Patent No.: US 11,094,270 B2
(45) Date of Patent: Aug. 17, 2021

(54) DISPLAY DEVICE AND DRIVE METHOD THEREFOR

(71) Applicants:Chongqing BOE Optoelectronics Technology Co., Ltd., Chongqing (CN); BOE Technology Group Co., Ltd., Beijing (CN)

(72) Inventors: Xianyong Gao, Beijing (CN); Qiang Yu, Beijing (CN); Fanjian Zeng, Beijing (CN); Siqing Fu, Beijing (CN); Xu Lu, Beijing (CN); Liang Gao, Beijing (CN); Sijun Lei, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/641,717

(22) PCT Filed: Mar. 25, 2019

(86) PCT No.: PCT/CN2019/079593
§ 371 (c)(1),
(2) Date: Feb. 25, 2020

(87) PCT Pub. No.: WO2019/192346
PCT Pub. Date: Oct. 10, 2019

(65) Prior Publication Data
US 2020/0211484 A1   Jul. 2, 2020

(30) Foreign Application Priority Data
Apr. 2, 2018 (CN) .......................... 201810284973.0

(51) Int. Cl.
*G02F 1/1334* (2006.01)
*G09G 3/34* (2006.01)
*G09G 3/36* (2006.01)

(52) U.S. Cl.
CPC ......... *G09G 3/3426* (2013.01); *G02F 1/1334* (2013.01); *G09G 3/3611* (2013.01);
(Continued)

(58) Field of Classification Search
CPC ... G09G 3/3426; G09G 3/3611; G02F 1/1334
See application file for complete search history.

(56) References Cited

U.S. PATENT DOCUMENTS 6,819,393 B1    11/2004 Date et al.
9,035,867 B2 *   5/2015 Yoshida .................. H01L 27/12
                                            345/102
(Continued)

FOREIGN PATENT DOCUMENTS

CN    101170642 A    4/2008
CN    101833921 A    9/2010
(Continued)

OTHER PUBLICATIONS

Chinese Office Action in corresponding application No. 201810284973.0 dated Apr. 17, 2019.
(Continued)

*Primary Examiner* — Nitin Patel
*Assistant Examiner* — Robert M Stone
(74) *Attorney, Agent, or Firm* — Arent Fox LLP; Michael Fainberg

(57) ABSTRACT

A display device and a drive method, the display device including: an edge-lit backlight module; a liquid crystal display panel positioned on the light-emergent side of the edge-lit backlight module; and a polymer liquid crystal film positioned between the liquid crystal display panel and the
(Continued)

edge-lit backlight module, and including a plurality of closely arranged independent dimming areas, each dimming area being configured for independent control of light transmittance. The present display device takes advantage of the characteristics of the polymer liquid crystal film, loading different driving voltages in different dimming areas and changing the transmittance of the polymer liquid crystal film.

12 Claims, 4 Drawing Sheets

(52) U.S. Cl.
CPC ... *G02F 1/13345* (2021.01); *G09G 2320/062* (2013.01); *G09G 2320/0626* (2013.01); *G09G 2360/16* (2013.01)

(56) References Cited

U.S. PATENT DOCUMENTS

| | | | | |
|---|---|---|---|---|
| 9,753,596 | B2* | 9/2017 | Aoki | G06F 3/04166 |
| 10,591,769 | B2* | 3/2020 | Harada | G09G 3/3406 |
| 2006/0056791 | A1* | 3/2006 | Tzschoppe | H04N 13/359 |
| | | | | 385/146 |
| 2007/0216616 | A1* | 9/2007 | Stessen | G09G 3/3413 |
| | | | | 345/84 |
| 2008/0284929 | A1* | 11/2008 | Kimura | G02F 1/1368 |
| | | | | 349/38 |
| 2009/0207613 | A1* | 8/2009 | Furukawa | G09G 3/3611 |
| | | | | 362/257 |
| 2011/0255304 | A1* | 10/2011 | Kinoshita | G02B 6/0038 |
| | | | | 362/607 |
| 2013/0033488 | A1* | 2/2013 | Takahashi | H04N 13/32 |
| | | | | 345/419 |
| 2013/0300981 | A1* | 11/2013 | Sakai | G02B 6/005 |
| | | | | 349/65 |
| 2014/0036176 | A1* | 2/2014 | Shinkai | G02B 6/0043 |
| | | | | 349/15 |
| 2014/0139461 | A1* | 5/2014 | Furukawa | G09G 3/342 |
| | | | | 345/173 |
| 2014/0232834 | A1* | 8/2014 | Sato | G09G 5/003 |
| | | | | 348/51 |
| 2014/0293188 | A1* | 10/2014 | Chen | G09G 3/3426 |
| | | | | 349/65 |
| 2015/0002563 | A1* | 1/2015 | Chen | G09G 3/3406 |
| | | | | 345/697 |
| 2015/0029437 | A1* | 1/2015 | Sakai | G02F 1/133634 |
| | | | | 349/61 |
| 2015/0379942 | A1* | 12/2015 | Guo | G09G 3/3426 |
| | | | | 345/102 |
| 2016/0093255 | A1* | 3/2016 | Aoki | G06F 3/0412 |
| | | | | 345/690 |
| 2016/0155402 | A1* | 6/2016 | Hoshino | G09G 3/3406 |
| | | | | 345/690 |
| 2016/0351102 | A1* | 12/2016 | Shin | G09G 3/2011 |
| 2017/0031187 | A1* | 2/2017 | Douyou | G02B 6/001 |
| 2017/0103715 | A1* | 4/2017 | Oyama | G02F 1/133504 |
| 2017/0256210 | A1* | 9/2017 | Kato | G02F 1/137 |
| 2017/0336676 | A1* | 11/2017 | Harada | G09G 3/2022 |
| 2017/0365461 | A1* | 12/2017 | Iwaki | H01L 21/0271 |
| 2018/0166002 | A1* | 6/2018 | Sako | G09G 3/2003 |
| 2019/0064559 | A1* | 2/2019 | Harada | G09G 3/3607 |
| 2019/0212543 | A1 | 7/2019 | Li | |
| 2020/0013351 | A1* | 1/2020 | Shan | G09G 3/3607 |
| 2020/0089052 | A1 | 3/2020 | Chen | |
| 2020/0183222 | A1* | 6/2020 | Yoon | G09G 3/3426 |
| 2020/0211484 | A1 | 7/2020 | Gao et al. | |

FOREIGN PATENT DOCUMENTS

| | | |
|---|---|---|
| CN | 102679238 A | 9/2012 |
| CN | 105911737 A | 8/2016 |
| CN | 106405882 A | 2/2017 |
| CN | 106782382 A | 5/2017 |
| CN | 107132697 A | 9/2017 |
| CN | 107908042 A | 4/2018 |
| CN | 108445578 A | 8/2018 |
| CN | 109154736 A | 1/2019 |

OTHER PUBLICATIONS

Chinese Office Action in corresponding application No. 201810284973.0 dated Jul. 17, 2019.

Decision of Rejection for corresponding application No. 201810284973.0 dated Oct. 22, 2019.

* cited by examiner

DISPLAY DEVICE AND DRIVE METHOD THEREFOR

CROSS REFERENCE TO RELATED APPLICATIONS

The present application is a US National Stage of International Application No. PCT/CN2019/079593, filed on Mar. 25, 2019, which claims the priority of a Chinese Patent Application No. 201810284973.0 filed with the Chinese Patent Office on Apr. 2, 2018 and entitled "an edge-lit backlight module, display module and backlight adjusting method", which is herein incorporated by reference in its entirety.

FIELD

The present disclosure relates to the technical field of display and in particular relates to a display device and a drive method therefor.

BACKGROUND

Since the display effect of a display device carrying a High-Dynamic Range (HDR) technique is closest to an image observed by human eyes, with increasing requirements on the display effect of the image by the human eyes, the HDR technique has become a trend. HDR is a technique needing to be supported by both hardware and software. From a hardware level, a display currently supporting HDR comprises an HDR-supported display with 4K resolution, an HDR-supported display with 2K resolution and an HDR-supported display with 1080P resolution. By adjusting display brightness of the display, the contrast between a darkest area and a brightest area in the image is enhanced to enrich the levels of the image.

In display of a Thin Film Transistor-Liquid Crystal Display (TFT-LCD), as the LCD itself does not glow, an image or character displayed by the LCD is a result of modulating light emitted by a backlight source. Thus the glowing effect of the backlight source will directly affect a visual effect of a liquid crystal display module. At present, the main technique of the LCD for realizing high-dynamic contrast is a local dimming technique. The backlight source used in the LCD, by adopting direct-lit architecture and controlling brightness of a Light Emitting Diode (LED) in the backlight source, adjusts the contrast of the displayed image, thereby making the LCD realize high-dynamic contrast. However, under the great trend of making the display light and thin, the direct-lit architecture is restricted by the bottleneck of thickness.

To sum up, under the precondition of ensuring the lightness and thinness of the display in the industry, an image display technique for enhancing contrast is urgently required at the current stage.

SUMMARY

A display device provided by an embodiment of the present disclosure comprises:
an edge-lit backlight module;
a liquid crystal display panel disposed on a light-emergent side of the edge-lit backlight module; and
a polymer liquid crystal film disposed between the liquid crystal display panel and the edge-lit backlight module, and comprising a plurality of closely arranged independent dimming areas, each dimming area being configured with independent control of light transmittance.

In a possible implementation, in the above display device provided by the embodiment of the present disclosure, the polymer liquid crystal film comprises an electrode structure located in each dimming area and being configured to control the light transmittance of a polymer liquid crystal layer in the dimming area.

In a possible implementation, in the above display device provided by the embodiment of the present disclosure, the electrode structure comprises a first electrode disposed on one side of the polymer liquid crystal layer and a second electrode disposed on other side of the polymer liquid crystal layer, where first electrodes in respective dimming areas are mutually insulated.

In a possible implementation, in the above display device provided by the embodiment of the present disclosure, second electrodes in respective dimming areas form an integral structure.

In a possible implementation, in the above display device provided by the embodiment of the present disclosure, second electrodes in respective dimming area are independent from each other.

In a possible implementation, in the above display device provided by the embodiment of the present disclosure, the second electrodes in each dimming area are conducted through signal lines.

In a possible implementation, in the above display device provided by the embodiment of the present disclosure, a material of the polymer liquid crystal layer in the polymer liquid crystal film is polymer dispersed liquid crystal or polymer network liquid crystal.

In a possible implementation, in the above display device provided by the embodiment of the present disclosure, the dimming areas in the polymer liquid crystal film are in array arrangement.

In a possible implementation, in the above display device provided by the embodiment of the present disclosure, the liquid crystal display panel comprises a plurality of sub-pixel areas in array arrangement, and one dimming area in the polymer liquid crystal film covers at least one sub-pixel area in the liquid crystal display panel.

In a possible implementation, in the above display device provided by the embodiment of the present disclosure, the liquid crystal display panel comprises a plurality of pixel areas in array arrangement and one dimming area in the polymer liquid crystal film covers at least one pixel area in the liquid crystal display panel.

In another aspect, an embodiment of the present disclosure provides a drive method of the above display device, comprising:
determining a gray value of each sub-pixel corresponding to each dimming area in an received image to be displayed according to the received image to be displayed and a corresponding relationship between the sub-pixels in the liquid crystal display panel and the dimming areas in the polymer liquid crystal film;
determining a driving parameter corresponding to each dimming area according to the gray value of each sub-pixel corresponding to each dimming area; and
driving respectively each dimming area of the polymer liquid crystal film, according to the driving parameter.

In a possible implementation, in the above drive method provided by the embodiment of the present disclosure, determining a driving parameter corresponding to each dimming area according to the gray value of each sub-pixel corresponding to each dimming area, particularly comprises:

for each dimming area, determining a quantity of gray values of respective corresponding sub-pixels in different preset gray level threshold ranges; and using a driving parameter corresponding to a preset gray level threshold range with a maximum quantity of gray values as the driving parameter corresponding to the dimming area.

In a possible implementation, in the above drive method provided by the embodiment of the present disclosure, using the driving parameter corresponding to the preset gray level threshold range with the maximum quantity of gray values as the driving parameter corresponding to the dimming area, particularly comprises:

determining the preset gray level threshold range with the maximum quantity of gray values;

determining a driving voltage corresponding to the preset gray level threshold range with the maximum quantity of gray values, according to a relationship between preset gray level threshold ranges and driving voltages; and using determined driving voltage as the driving parameter corresponding to the dimming area.

In a possible implementation, in the above drive method provided by the embodiment of the present disclosure, according to the driving parameter, driving respectively each dimming area of the polymer liquid crystal film, particularly comprises:

applying a reference voltage to a second electrode of each dimming area;

applying a dimming voltage to a first electrode of each dimming area, wherein a difference value between the dimming voltage and the reference voltage is the driving voltage.

DETAILED DESCRIPTION OF THE EMBODIMENTS

The preferred embodiments of the present disclosure will be illustrated below in combination with accompanying drawings. It should be understood that the preferred embodiments described herein are merely used for stating and interpreting the present disclosure, but not to define the present disclosure. Moreover, under a non-conflicting case, the embodiments in the present disclosure and features of the embodiments may be combined to each other.

Figure 1A:
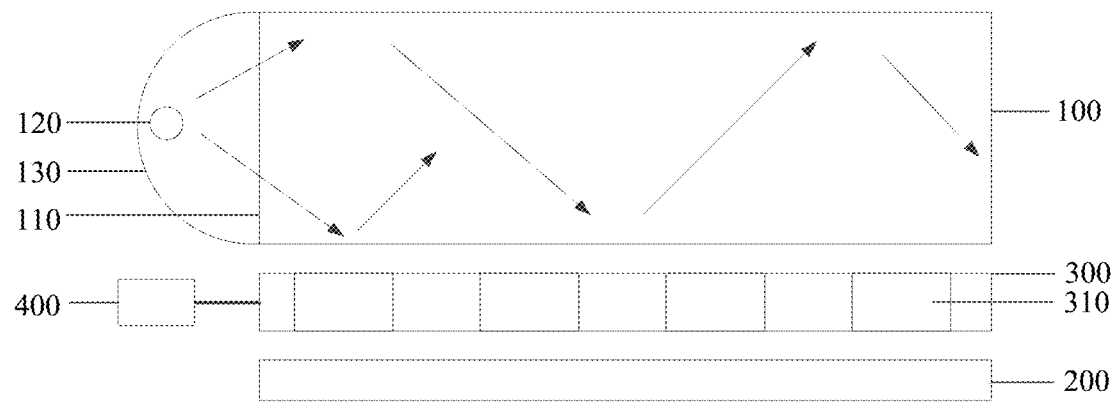
FIGS. 1a and 1b are respectively a structural schematic diagram of a display device provided by an embodiment of the present disclosure.
Figure 1B:
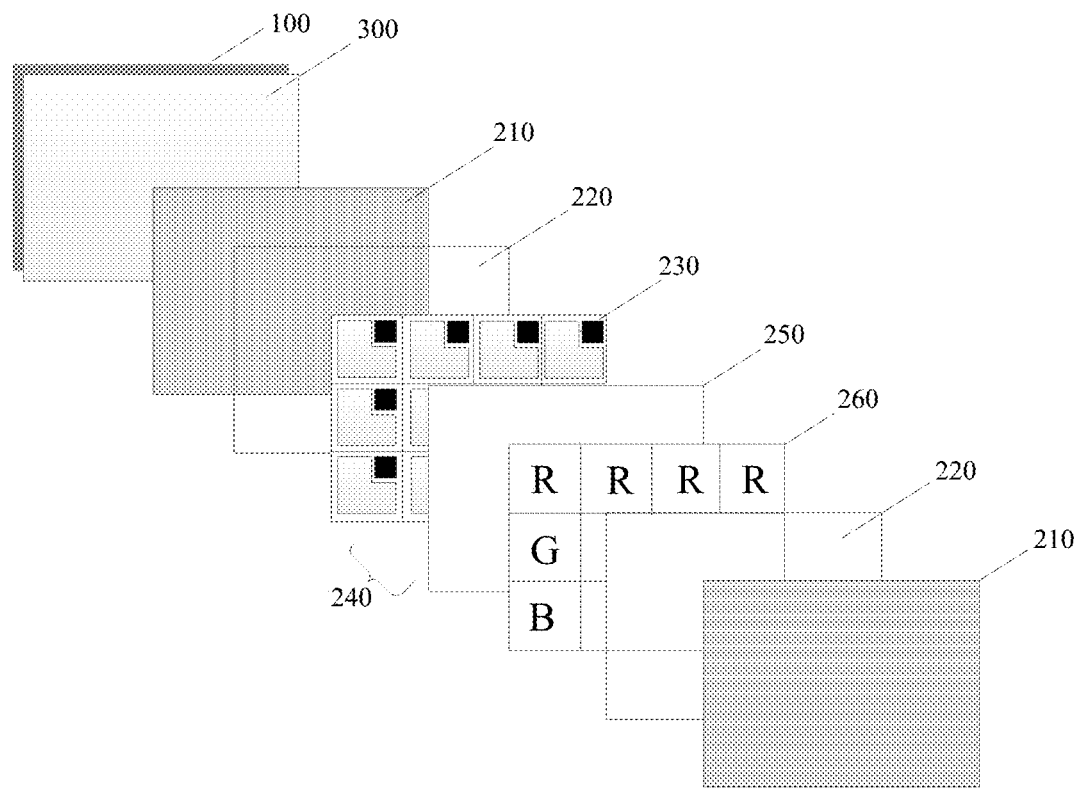

A display device provided by an embodiment of the present disclosure as shown in FIGS. 1a and 1b comprises:

an edge-lit backlight module 100;

a liquid crystal display panel 200 disposed on a light-emergent side of the edge-lit backlight module 100; and a polymer liquid crystal film 300 disposed between the liquid crystal display panel 200 and the edge-lit backlight module 100, and comprising a plurality of closely arranged independent dimming areas 310, each dimming area being configured with independent control of light transmittance.

Since a backlight module is integrally divided into a plurality of areas in related techniques, and transmittance of light is controlled by the plurality of areas respectively, through this manner, the backlight module at mostly may be divided into one hundred areas, failing to satisfy increasing requirements on the contrast of an image. According to the display device provided by the embodiment of the present disclosure, the polymer liquid crystal film 300 is disposed between the edge-lit backlight module 100 and the liquid crystal display panel 200. Through a manner of dividing the polymer crystal liquid film 300 into a plurality of independent dimming areas 310, adjustment of high-dynamic brightness contrast is realized. In the polymer liquid crystal film 300, according to a contrast range required for display, the number and size of the dimming areas 310 are divided. In general, the larger the required contrast range, the finer the divided dimming area 310. When the contrast range of a display image required by the display panel is large, in the polymer liquid crystal film 300, the number of dimming areas 310 increases correspondingly, and even one dimming area 310 is correspondingly set for each pixel in the display panel 100, thus realizing adjustment of the brightness value of each pixel to maximize the contrast of the display image.

In particular, in the display device provided by the embodiment of the present disclosure, as shown in FIG. 1a, the edge-lit backlight module 100 comprises a light guide plate 110, a light source 120 arranged on one side of the light guide plate 110, and a reflecting plate 130 arranged around the light source 120. A light-emergent surface of the light guide plate 110 emits uniform backlight. By modulating each dimming area in the polymer liquid crystal film 300, adjustment of different brightness from each dimming area 310 to the liquid crystal display panel 200 is realized.

In particular, in the display device provided by the embodiment of the present disclosure, as shown in FIG. 1b, the display panel 200 at least comprises a polarizing plate 210, a transparent substrate 220, pixel electrodes 230, a liquid crystal layer 240, a common electrode 250 and an optical filter 260, wherein detailed structures of the pixel electrodes 230 and the common electrode 250 may be various and are not described in details herein.

Figure 2A:
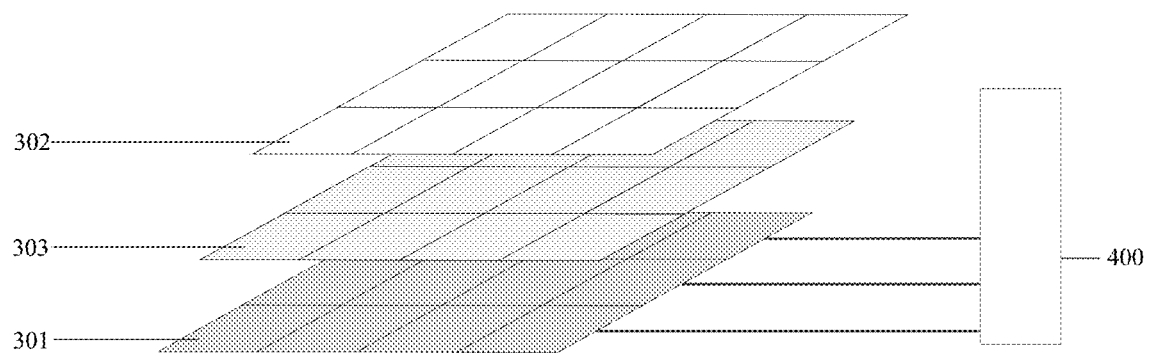
FIGS. 2a to 2c are respectively a structural schematic diagram of a polymer liquid crystal film in the display device provided by the embodiment of the present disclosure.
Figure 2B:
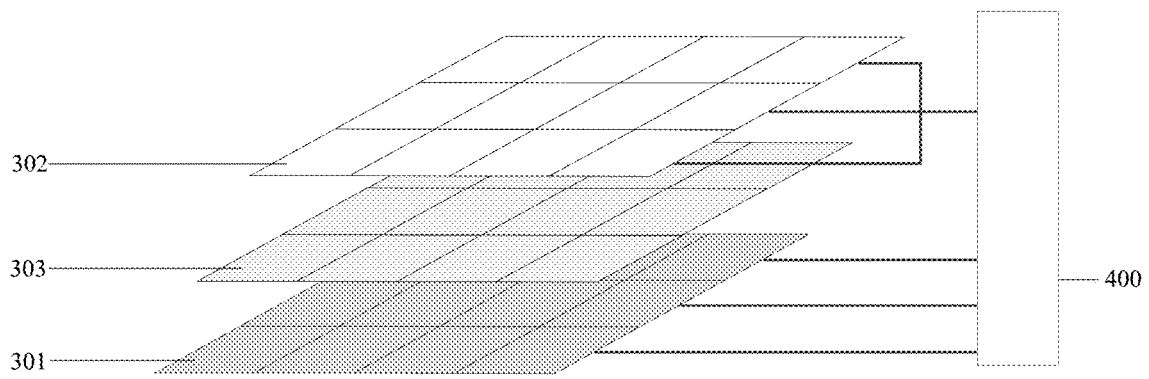
Figure 2C:
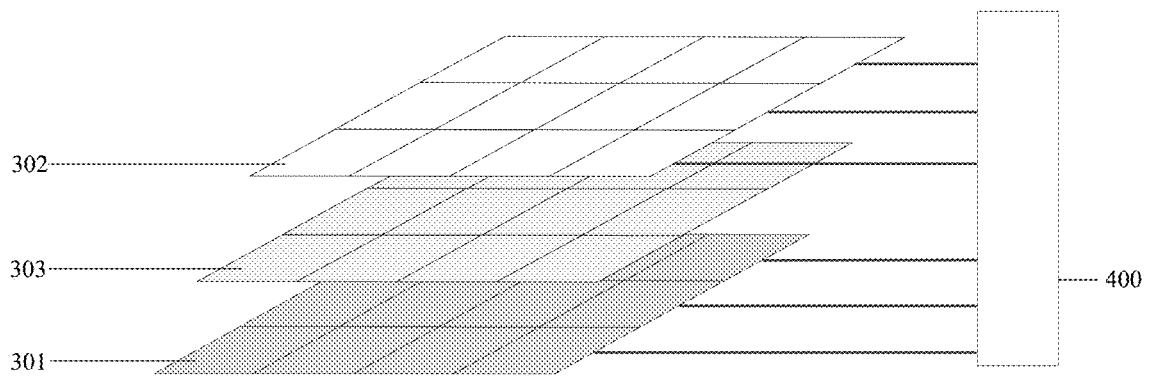

Optionally, in the above display device provided by the embodiment of the present disclosure, in order to realize independent control of light transmittance of each dimming area 310, as shown in FIGS. 2a to 2c, the polymer liquid crystal film 300 may comprise an electrode structure located in each dimming area 310 and configured to control the light transmittance of a polymer liquid crystal layer 303 in the dimming area 310. In this way, through the electrode structure in each dimming area 310, a voltage applied to the polymer liquid crystal layer 303 may be adjusted, thereby realizing adjustment of the light transmittance of the polymer liquid crystal layer 303 in the dimming area. When voltages loaded to the polymer liquid crystal layer 303 are different, an optical axis of a polymer liquid crystal molecule deflects to change the polymer liquid crystal molecule from a scattering state to a transparent state, thus adjusting transmittance of the polymer liquid crystal layer 303. In general, the transmittance of the polymer liquid crystal layer 303 is proportional with the voltage applied thereto. In order to better adapt to visual perception requirements of the human eyes on a brightness degree, by properly adjusting gray level voltage values, a curve formed by the transmittance of the polymer liquid crystal layer 303 and the voltage applied thereto can comply with a GMA curve, where the GMA curve is a curve of gray level voltage and transmittance. When the human eyes are in a best state for perceiving brightness, the GMA level is 2.2.

Optionally, in the above display device provided by the embodiment of the present disclosure, as shown in FIGS. 2a to 2c, the electrode structure may particularly comprise first electrodes 301 disposed on one side of the polymer liquid crystal layer 303 and second electrodes 302 disposed on the other side of the polymer liquid crystal layer 303, and the first electrodes in each dimming area are mutually insulated. By applying different first voltage signals to the first electrodes 301 and same second voltage signals to the second electrodes 302, adjustment of voltage applied to the polymer liquid crystal layer 303 may be realized, thereby realizing adjustment of the transmittance of the polymer liquid crystal layer 303.

In particular, the first electrodes 301 in each dimming area 310 may be electrically connected to a control circuit 400 through signal lines respectively; and through the control circuit 400, the first voltage signals applied to the first electrodes 301 may be adjusted.

Optionally, in the above display device provided by the embodiment of the present disclosure, as shown in FIG. 2a, the second electrodes 302 in each dimming area 310 may form an integral structure, i.e., the second electrodes 302 in each dimming area 310 are mutually connected to each other to form a planar electrode. In particular, the planar electrode may be electrically connected to the control circuit 400 directly to apply the second voltage signals which may be the same with common voltage signals in the display panel.

Optionally, in the above display device provided by the embodiment of the present disclosure, as shown in FIG. 2c, the second electrodes 302 in each dimming area 310 may also be mutually independent, i.e., the second electrodes 302 in each dimming area are arranged at interval. In particular, the mutually independent second electrodes 302 may be respectively electrically connected to the control circuit 400 through different signal lines to apply same or different second voltage signals. The same second voltage signals may be the same with the common voltage signals in the liquid crystal display panel 200.

Optionally, in the above display device provided by the embodiment of the present disclosure, as shown in FIG. 2b, the second electrodes 302 in each dimming area 310 are conducted through signal lines, and afterward electrically connected to the control circuit 400 through a conducting line in a unified manner to apply the same second voltage signals, and the second voltage signals may be the same with the common voltage signals in the liquid crystal display panel 200.

In the above display device provided by the embodiment of the present disclosure, an arrangement manner of the dimming areas 310 in the polymer liquid crystal film 300 may be determined according to an arrangement manner of sub-pixels in the liquid crystal display panel and a contrast range of an image needing to be displayed.

Figure 3A:
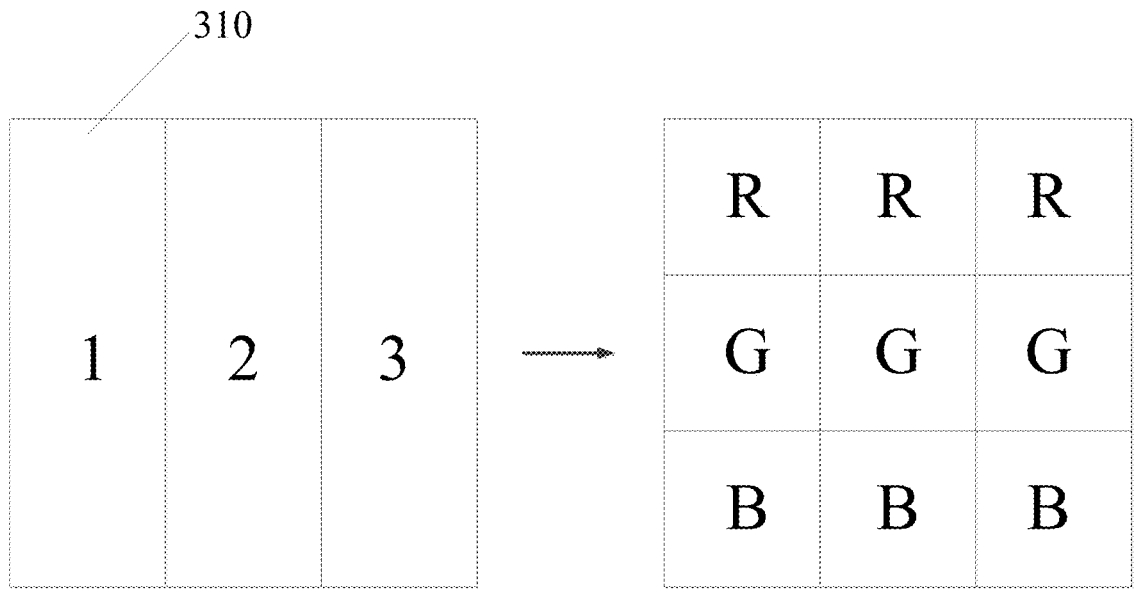
FIGS. 3a and 3b are respectively a schematic diagram of a corresponding relationship between sub-pixels and dimming areas in the display device provided by the embodiment of the present disclosure.
Figure 3B:
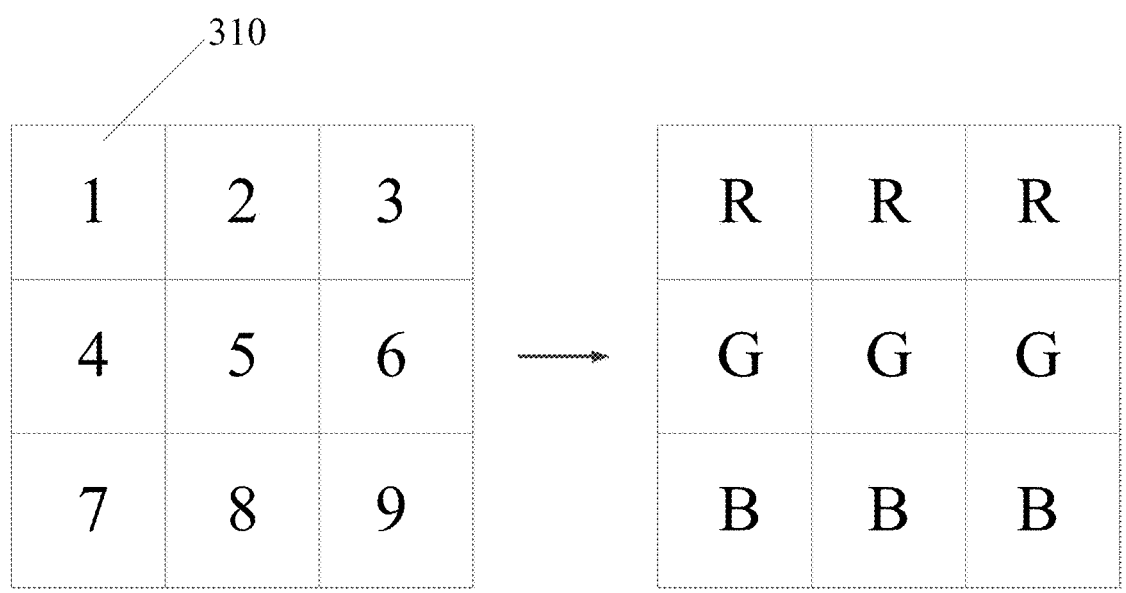

Optionally, in the above display device provided by the embodiment of the present disclosure, as shown in FIGS. 3a and 3b, the dimming areas 310 in the polymer liquid crystal film 300 are in array arrangement according to a contrast adjustment range.

Optionally, in the above display device provided by the embodiment of the present disclosure, as shown in FIG. 3b, the liquid crystal display panel 200 generally comprises a plurality of sub-pixel areas R, G, B in array arrangement, and one dimming area 310 in the polymer liquid crystal film 300 may cover at least one sub-pixel area R, G, B in the liquid crystal display panel 200.

Optionally, in the above display device provided by the embodiment of the present disclosure, as shown in FIG. 3a, the liquid crystal display panel comprises a plurality of pixel areas in array arrangement, i.e., forming a pixel area by RGB; and one dimming area 310 in the polymer liquid crystal film 300 may cover at least one pixel area RGB in the liquid crystal display panel 200.

In the above display device provided by the embodiment of the present disclosure, a material of the polymer liquid crystal layer 303 in the polymer liquid crystal film 300 may be Polymer Dispersed Liquid Crystal (PDLC) and may also be Polymer Network Liquid Crystal (PNLC). Moreover, the embodiment of the present disclosure is not restricted to the polymer liquid crystal layer 303 prepared from the above two materials, and different voltages are applied to two sides of the polymer liquid crystal film 300 prepared from any one of the polymer liquid crystal materials, and materials causing changes to the transmittance of the polymer liquid crystal film are all included in the embodiment of the present disclosure.

In the embodiment of the present disclosure, the display device may be a handheld device, an on-board device, a wearable device or a computing device having a display function, such as a mobile phone, a tablet PC, a laptop, a television and a smart watch.

Figure 4:
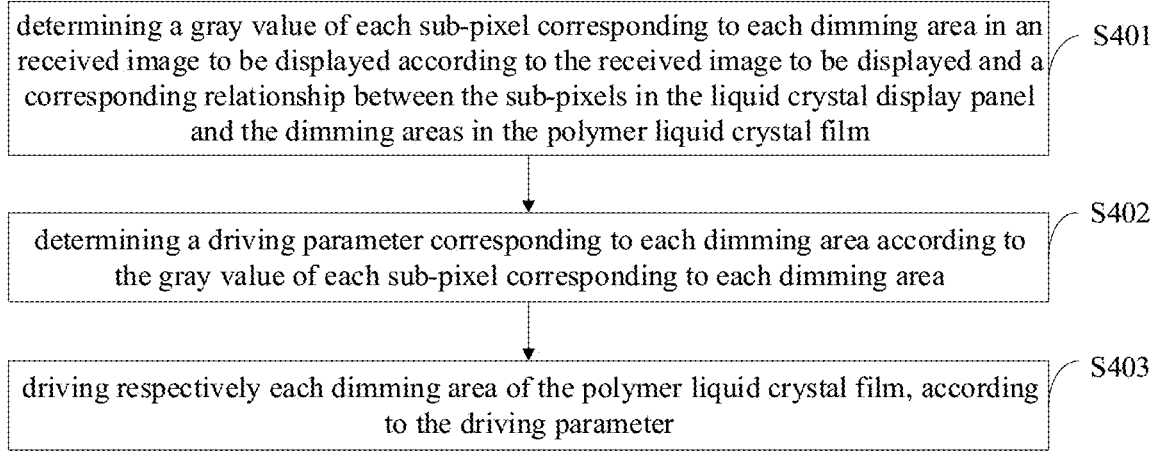
FIG. 4 is a flow diagram of a drive method provided by an embodiment of the present disclosure.

The embodiment of the present disclosure further provides a drive method of the above display device, as shown in FIG. 4, comprising:

S401: determining a gray value of each sub-pixel corresponding to each dimming area in an received image to be displayed according to the received image to be displayed and a corresponding relationship between the sub-pixels in the liquid crystal display panel and the dimming areas in the polymer liquid crystal film;

S402: determining a driving parameter corresponding to each dimming area according to the gray value of each sub-pixel corresponding to each dimming area; and S403: driving respectively each dimming area of the polymer liquid crystal film, according to the driving parameter.

Optionally, in the above drive method provided by the embodiment of the present disclosure, determining a driving parameter corresponding to each dimming area according to the gray value of each sub-pixel corresponding to each dimming area in S402, may particularly comprise:

firstly, for each dimming area, determining a quantity of gray values of respective corresponding sub-pixels in different preset gray level threshold ranges; and afterward, using a driving parameter corresponding to a preset gray level threshold range with the maximum quantity of gray values as the driving parameter corresponding to the dimming area.

Optionally, in the above drive method provided by the embodiment of the present disclosure, using the driving parameter corresponding to the preset gray level threshold range with the maximum quantity of gray values as the driving parameter corresponding to the dimming area, may particularly comprise:

determining the preset gray level threshold range with the maximum quantity of gray values;

determining a driving voltage corresponding to the preset gray level threshold range with the maximum quantity of gray values, according to a relationship between preset gray level threshold ranges and driving voltages; and using determined driving voltage as the driving parameter corresponding to the dimming area.

For example, the relationship between the preset gray threshold ranges and the driving voltages is: if a pixel gray value of a display image is greater than or equal to 0 and smaller than 64, it is determined to belong to a first set, for which a driving voltage, for example 3V (Volt), is applied; if the pixel gray value of the display image is greater than or equal to 64 and smaller than 128, it is determined to belong to a second set, for which a driving voltage of 6V is loaded; if the pixel gray value of the display image is greater than or equal to 128 and smaller than 192, it is determined to belong to a third set, for which a driving voltage of 9V is loaded; if the pixel gray value of the display image is greater than or equal to 192 and smaller than or equal to 256, it is determined to belong to a fourth set, for which a driving voltage of 12V is applied. According to the above relationships, there are four brightness values of the backlight module.

Figure 5:
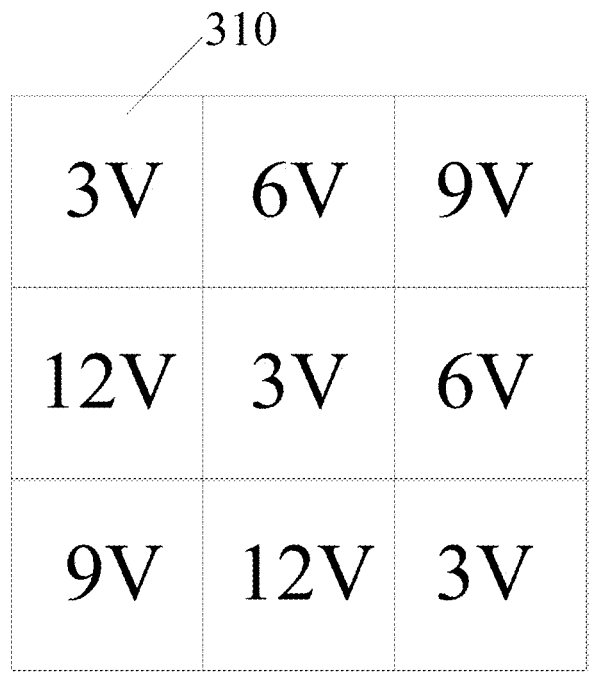
FIG. 5 is a schematic diagram of a driving voltage applied to each dimming area in the display device provided by the embodiment of the present disclosure.

The gray values of the sub-pixels in the corresponding dimming areas in the image to be displayed are determined, and the number of the sub-pixels whose corresponding gray values respectively falling into the first set, the second set, the third set and the fourth set is counted. Assuming that the number of the sub-pixels falling into the first set is the most, it is determined that the driving voltage of the dimming area is 3V and finally the driving voltage applied to each dimming area as shown in FIG. 5 is obtained.

Optionally, in the above drive method provided by the embodiment of the present disclosure, according to the driving parameter, driving respectively each dimming area of the polymer liquid crystal film in S403, particularly comprises:

applying a reference voltage, i.e., second voltage signals, to a second electrode of each dimming area;

applying a dimming voltage, i.e., first voltage signals, to a first electrode of each dimming area, where a difference between the dimming voltage and the reference voltage is the driving voltage.

To sum up, the embodiment of the present disclosure provides a display device and drive method therefor. By utilizing the features of the polymer liquid crystal film, the different driving voltages are applied to the different dimming areas, thus changing the transmittance of the polymer liquid crystal film, so that adjustment of the backlight brightness of the different dimming areas can be realized without needing to alter the light source, and local dimming is realized, and therefore, the contrast of the display image is increased, and further a visual effect of the display image is improved.

Those skilled in the art should understand that the embodiments of the present invention can provide a method, a system or a computer program product. Therefore, the present disclosure can adopt forms of a complete hardware embodiment, a complete software embodiment, or an embodiment of combining software and hardware. Moreover, the present disclosure can adopt a form of a computer program product implemented on one or more computer usable storage media (including but not limited to a disk memory, and an optical memory etc.) in which computer usable program codes are contained.

The present disclosure is described according to flow diagrams and/or block diagrams of the method, the device (system) and the computer program product in the embodiments of the present disclosure. It should be understood that computer program instructions realize each process and/or block in the flow diagrams and/or the block diagrams and a combination of the processes and/or blocks in the flow diagrams and/or the block diagrams. The computer program instructions can be provided to a universal computer, a dedicated computer, an embedded processor or processors of other programmable data processing devices to generate a machine, so that a device for realizing one or multiple processes in the flow diagrams and/or functions specified in one or more blocks in the block diagrams is produced through instructions executed by the computer or the processors of the other programmable data processing devices.

The computer program instructions can be also stored in a computer readable memory capable of instructing the computer or the other programmable data processing devices to work in a specific manner, so as to cause the instructions stored in the computer readable memory to generate a product comprising an instruction device. The instruction device realizes the one or more processes in the flow diagrams and/or the functions specified in the one or more blocks in the block diagrams.

The computer program instructions can also be loaded to the computer or the other programmable data processing devices, so as to perform a series of operation steps on the computer or the other programmable devices to generate processing realized by the computer, so that the instructions performed on the computer or the other programmable devices are provided for realizing steps of the one or more processes in the flow diagrams and/or the functions specified in one or more blocks in the block diagram.

Obviously, those skilled in the art can make various modifications and variations to the present disclosure without departing from the spirit and scope of the present disclosure. In this way, if the modifications and variations to the present disclosure belong to the claims of the present disclosure and the range of equivalent techniques thereof, the present disclosure also intends to include the modifications and variations inside.

The invention claimed is:

1. A drive method, wherein the drive method comprises:
   determining a gray value of each sub-pixel corresponding to each dimming area in a received image to be displayed, according to the image to be displayed, and a corresponding relationship between the sub-pixels in a liquid crystal display panel and dimming areas in a polymer liquid crystal film;
   determining a driving parameter corresponding to each dimming area according to the gray value of each sub-pixel corresponding to each dimming area; and
   driving respectively each dimming area of the polymer liquid crystal film, according to the driving parameter;
   wherein determining a driving parameter corresponding to each dimming area according to the gray value of each sub-pixel corresponding to each dimming area, particularly comprises:
   for each dimming area, determining a quantity of gray values of respective corresponding sub-pixels in different preset gray level threshold ranges; and
   using a driving parameter corresponding to a preset gray level threshold range with a maximum quantity of gray values as the driving parameter corresponding to the dimming area; and
   wherein using the driving parameter corresponding to the preset gray level threshold range with the maximum quantity of gray values as the driving parameter corresponding to the dimming area, particularly comprises:

determining the preset gray level threshold range with the maximum quantity of gray values;

determining a driving voltage corresponding to the preset gray level threshold range with the maximum quantity of gray values, according to a relationship between preset gray level threshold ranges and driving voltages; and using determined driving voltage as the driving parameter corresponding to the dimming area.

2. The drive method of claim 1, wherein the drive method drives a display device, wherein the display device comprises:

an edge-lit backlight module;

the liquid crystal display panel disposed on a light-emergent side of the edge-lit backlight module; and the polymer liquid crystal film disposed between the liquid crystal display panel and the edge-lit backlight module, and comprising a plurality of closely arranged independent dimming areas, each dimming area being configured with independent control of light transmittance.

3. The drive method of claim 2, wherein the polymer liquid crystal film comprises an electrode structure located in each dimming area and configured to control the light transmittance of a polymer liquid crystal layer in the dimming area.

4. The drive method of claim 3, wherein the electrode structure comprises a first electrode disposed on one side of the polymer liquid crystal layer and a second electrode disposed on other side of the polymer liquid crystal layer, wherein first electrodes in respective dimming areas are mutually insulated.

5. The drive method of claim 4, wherein second electrodes in respective dimming areas form an integral structure.

6. The drive method of claim 4, wherein second electrodes in respective dimming area are independent from each other.

7. The drive method of claim 6, wherein the second electrodes in each dimming area are conducted through signal lines.

8. The drive method of claim 2, wherein a material of the polymer liquid crystal layer in the polymer liquid crystal film is polymer dispersed liquid crystal or polymer network liquid crystal.

9. The drive method of claim 2, wherein the dimming areas in the polymer liquid crystal film are in array arrangement.

10. The drive method of claim 9, wherein the liquid crystal display panel comprises a plurality of sub-pixel areas in array arrangement, and one dimming area in the polymer liquid crystal film covers at least one sub-pixel area in the liquid crystal display panel.

11. The drive method of claim 9, wherein the liquid crystal display panel comprises a plurality of pixel areas in array arrangement, and one dimming area in the polymer liquid crystal film covers at least one pixel area in the liquid crystal display panel.

12. The drive method of claim 1, wherein driving respectively each dimming area of the polymer liquid crystal film, according to the driving parameter, particularly comprises:

applying a reference voltage to a second electrode of each dimming area;

applying a dimming voltage to a first electrode of each dimming area, wherein a difference between the dimming voltage and the reference voltage is the driving voltage.

* * * * *